(12) United States Patent
Dabak et al.

(10) Patent No.: US 12,273,852 B2
(45) Date of Patent: Apr. 8, 2025

(54) SUPER RESOLUTION RADIO FREQUENCY LOCATION DETERMINATION

(71) Applicant: TEXAS INSTRUMENTS INCORPORATED, Dallas, TX (US)

(72) Inventors: Anand Dabak, Plano, TX (US); Marius Moe, Fetsund (NO); Charles Sestok, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 300 days.

(21) Appl. No.: 17/537,882

(22) Filed: Nov. 30, 2021

(65) Prior Publication Data

US 2022/0091216 A1    Mar. 24, 2022

Related U.S. Application Data

(62) Division of application No. 16/232,783, filed on Dec. 26, 2018, now abandoned.

(51) Int. Cl.
*H04W 64/00* (2009.01)
*G01S 3/16* (2006.01)
(Continued)

(52) U.S. Cl.
CPC .......... *H04W 64/006* (2013.01); *G01S 3/16* (2013.01); *G01S 3/48* (2013.01); *G01S 3/58* (2013.01); *H04W 64/003* (2013.01)

(58) Field of Classification Search
CPC ................. G01S 3/16; G01S 3/48; G01S 3/58
(Continued)

(56) References Cited

U.S. PATENT DOCUMENTS

2010/0109844 A1    5/2010    Carrick et al.
2011/0148714 A1    6/2011    Schantz et al.
(Continued)

FOREIGN PATENT DOCUMENTS

| CN | 104040367 A | 9/2014 |
|---|---|---|
| CN | 107131885 A | 9/2017 |
| JP | 2007024642 A | 2/2007 |

OTHER PUBLICATIONS

Office Action issued in corresponding China Application No. CN201911348598.2, dated May 21, 2024.
(Continued)

*Primary Examiner* — Bo Fan
(74) *Attorney, Agent, or Firm* — John R. Pessetto; Frank D. Cimino

(57) ABSTRACT

Using a phase interferometry method which utilizes both amplitude and phase allows the determination and estimation of multipath signals. To determine the location of an object, a signal that contains sufficient information to allow determination of both amplitude and phase, like a packet that includes a sinewave portion, is provided from a master device. A slave device measures the phase and amplitude of the received packet and returns this information to the master device. The slave device returns a packet to the master that contains a similar sinewave portion to allow the master device to determine the phase and amplitude of the received signals. Based on the two sets of amplitude and phase of the RF signals, the master device utilizes a fast Fourier transform or techniques like multiple signal classification to determine the indicated distance for each path and thus more accurately determines a location of the slave device.

38 Claims, 8 Drawing Sheets

(51) Int. Cl.
*G01S 3/48* (2006.01)
*G01S 3/58* (2006.01)

(58) Field of Classification Search
USPC .................. 342/125, 458, 357.27, 357.54
See application file for complete search history.

(56) References Cited

U.S. PATENT DOCUMENTS

| 2012/0032855 | A1 | 2/2012 | Reede | |
| 2014/0232588 | A1* | 8/2014 | Lee | G01S 5/0289 342/125 |
| 2017/0026798 | A1 | 1/2017 | Prevatt | |
| 2017/0343333 | A1 | 11/2017 | Thorpe et al. | |
| 2019/0053013 | A1* | 2/2019 | Markhovsky | G01S 5/12 |

OTHER PUBLICATIONS

Alsubaie, Fawwaz. "Multiple Signal Classification for Determining Direction of Arrival of Frequency Hopping Spread Spectrum Signals." (Thesis) Air Force Institute of Technology, AFIT-ENG-14-M-05. Mar. 2014.

Börjesson, Mandus. "Getting Started With the CC13xx and CC26xx Sensor Controller." Texas Instruments, Application Report SWRA578—Oct. 2017, pp. 1-22.

Chongying Qi, Yonliang Wang, Yongshum Zhang and Ying Han. "Spatial Differences Smoothing for DOA Estimation of Coherent Signals." IEEE Signal Processing Letters, vol. 12, No. 11, Nov. 2005, pp. 800-802.

Kotaru, Manikanta, Kiran Joshi, Dinesh Bharadia, and Sachin Katti. "SpotFi: Decimeter Level Localization Using WiFi." SIGCOMM '15, August 17-21, London, UK, pp. 269-282.

Pelka, Mathias, Christian Bollmeyer and Horst Hellbruck. "Accurate Radio Distance Estimation by Phase Measurement with Multiple Frequencies." 2014 International Conference on Indoor Positioning and Indoor Navigation, Oct. 27-30, 2014, pp. 142-151.

Schmidt, Ralph O. "Multiple Emitter Location and Signal Parameter Estimation." IEEE Transactions on Antennas and Propagation, vol. AP-34, No. 3, Mar. 1986, pp. 276-280.

Zeira, Ariela and Peter Schultheiss. "Realizable Lower Bounds for Time Delay Estimation: Part 2—Threshold Phenomena." IEEE Transactions on Signal Processing, vol. 42, No. 5, May 1994, pp. 1001-1007.

GIRD Systems, Inc., "An Introduction to MUSIC and ESPRIT," www.girdsystems.com/pdf/GIRD_Systems_Intro_to_MUSIC_ESPRIT.pdf, esp. slides 9-12.

MIT Dept of Electrical Engineering and Computer Science. 6.341 Discrete-Time Signal Processing, "Lecture 3—Minimum-Phase and All-Pass Systems." OpenCourseWare 2006, pp. 1-6. ocw.mit.edu/courses/electrical-engineering-and-computer-science/6-341-discrete-time-signal-processing-fall-2005/lecture-notes/lec03.pdf.

Texas Instruments, "CC2640 SimpleLinkTM Blootooth® Wireless MCU." SERS176B—Feb. 2015—Revised Jul. 2016.

Texas Instruments, "CC2541 Keyfob" schematics, tidr191, 2013.

* cited by examiner

SUPER RESOLUTION RADIO FREQUENCY LOCATION DETERMINATION

This application is a divisional of U.S. patent application Ser. No. 16/232,783, filed Dec. 26, 2018, the contents of which are incorporated by reference in its entirety.

BACKGROUND

Field

The field relates to location determination using radio frequency signals.

Description of the Related Art

It is often useful to use radiofrequency (RF) signals to determine the location of items. The RF signals of most interest are Bluetooth Low Energy (BLE), Wi-Fi® (especially with a bandwidth of 80 MHz) and sub-GHz signals (especially with a bandwidth of 20 MHz). One problem with the use of the RF signals is the accuracy that can be developed. For example, simply using time-of-flight of the RF signal can yield an accuracy of approximately 3-5 m, which is insufficient in many cases.

For the above mentioned RF signals there are several different methods of determining location from RF signals. A first is radio signal strength indication (RSSI). RSSI is highly susceptible to multipath issues so that it has an error of +/−10 dB. The second method is the previously mentioned time-of-flight approach. In this time-of-flight approach the clock frequency utilized to perform the measurements is critical. If a typical 40 MHz clock is utilized, the resolution that can be obtained by time-of-flight is only approximately 15 m. Further, time-of-flight is also susceptible to multipath problems. A third method is the angle of arrival (AoA). In angle of arrival, a series of antennas are utilized in various locations and then the location of the object can be obtained based on the received angle at each of the antenna groups. A typical accuracy is 5° but again, multipath is a problem. A fourth method that has been utilized is phase interferometry, where the phase at two frequencies or two locations is estimated and from that the distance can be determined. Yet again, multipath is a problem in utilizing phase interferometry.

If the desired location accuracy is small, such as 10 to 15 cm, the conventional approaches for BLE, WiFi, and sub-GHz systems are not directly usable, and multipath issues further render them problematic.

SUMMARY

Using a phase interferometry method which utilizes both amplitude and phase, instead of just phase, provides additional information that allows the determination and estimation of multipath signals. To determine the location of an object, a signal that contains sufficient information to allow determination of both amplitude and phase, such as a packet that includes a sinewave portion, is provided from a master device to a slave device. The slave device measures the phase and amplitude of the received packet and returns this information to the master device. The slave device also returns a packet to the master that contains a similar sinewave portion to allow the master device to determine the phase and amplitude of the received signals. Based on the two sets of amplitude and phase of the RF signals, the master device utilizes a fast Fourier transform (FFT) or other techniques like multiple signal classification (MUSIC) to determine the indicated distance for each path and thus more accurately determines a location of the slave device in relation to the master device.

BRIEF DESCRIPTION OF THE FIGURES

For a detailed description of various examples, reference will now be made to the accompanying drawings in which.

DETAILED DESCRIPTION

Figure 1:
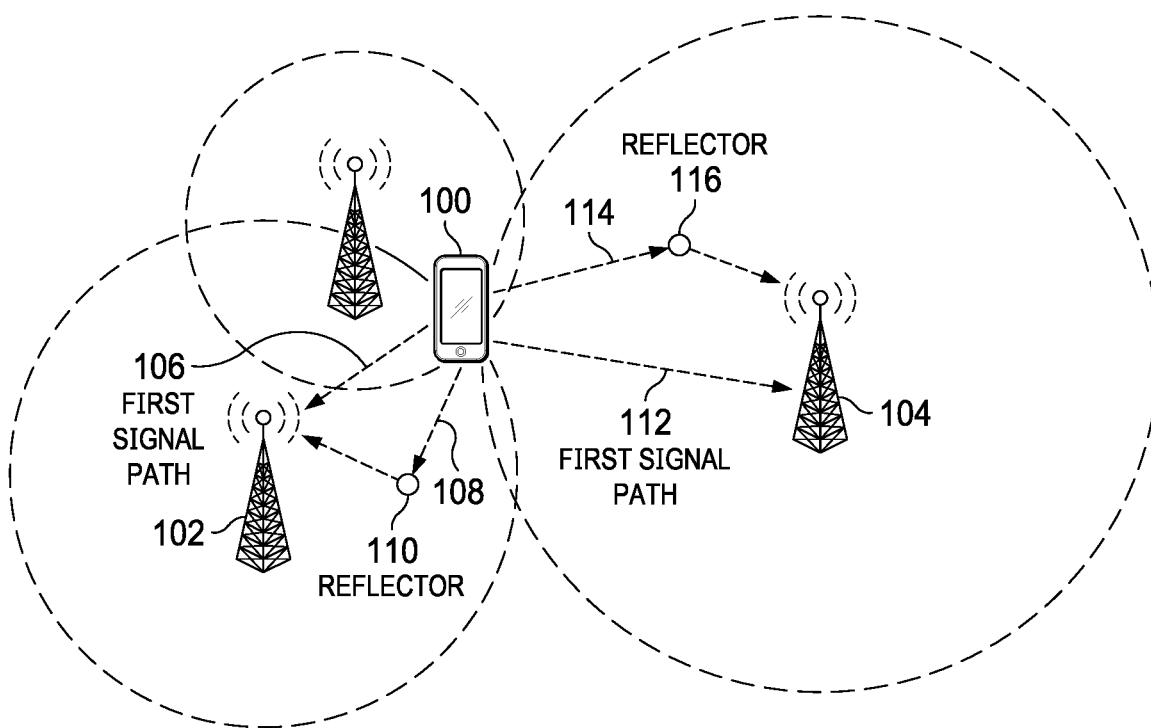
FIG. 1 is a block diagram illustrating multipath.

Referring now to FIG. 1, a phone 100 is trying to determine the location of a first object 102 (which can be a BLE access point) and a second object 104 (which can be another BLE access point). In this example, and the examples described in this description, Bluetooth® is used as the exemplary RF signal, though it is understood that other protocols and signals could be utilized. The phone 100 is transmitting a Bluetooth signal. With regard to the first object 102, the target Bluetooth device, the Bluetooth signal takes a direct signal path 106 and a reflected signal path 108. The reflected signal path 108 proceeds from the phone 100 to a reflector no and then to the first object 102. Similarly, with regard to the second object 104, another target Bluetooth device, the Bluetooth signal has a direct path 112 and a reflected path 114, which is reflected from a reflector 116. The presence of the reflectors 110 and 116 results in the first object 102 and second object 104 receiving the transmitted Bluetooth signal at two different times and with two different amplitudes. The reflected signals thus create interference to the direct signals and hinder the development of accurate location values because of the induced interference to the direct signals.

Figure 2:
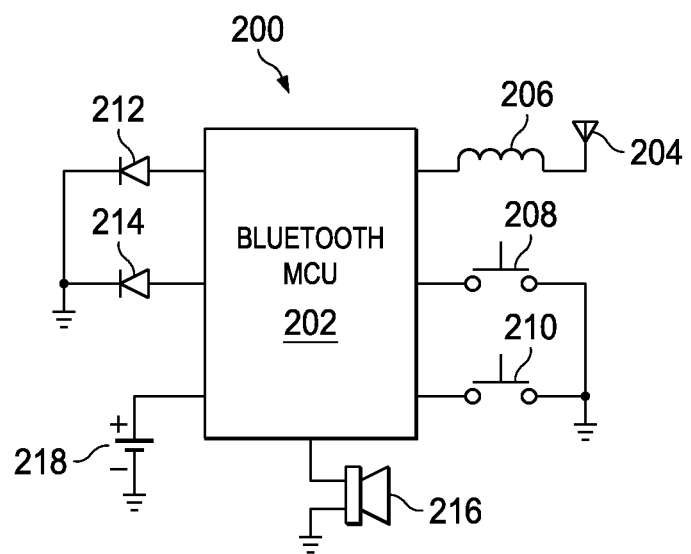
FIG. 2 is a block diagram of a Bluetooth device.

FIG. 2 is a block diagram of a simple Bluetooth device, in the illustrated case a Bluetooth key fob 200. A Bluetooth microcontroller 202, such as a Texas Instruments® CC2640 SimpleLink™ Bluetooth wireless MCU (microcontroller), is the primary component in the key fob 200. An antenna 204 is connected through an inductor 206 to the Bluetooth MCU 202 to allow transmission and reception of the Bluetooth signals. First and second buttons 208 and 210 provide user input, such as lock and unlock. First and second light emitting diodes (LEDs) 212 and 214 provide visual feedback to the user of operations of the key fob 200. A speaker 216 is connected to the Bluetooth MCU 202 to provide audible feedback to the user. A battery 218 provides power to the key fob 200, particularly the Bluetooth MCU 202. This is a very simple block diagram for purposes of this explanation and actual units would use more and different components and be more elaborate.

Figure 3:
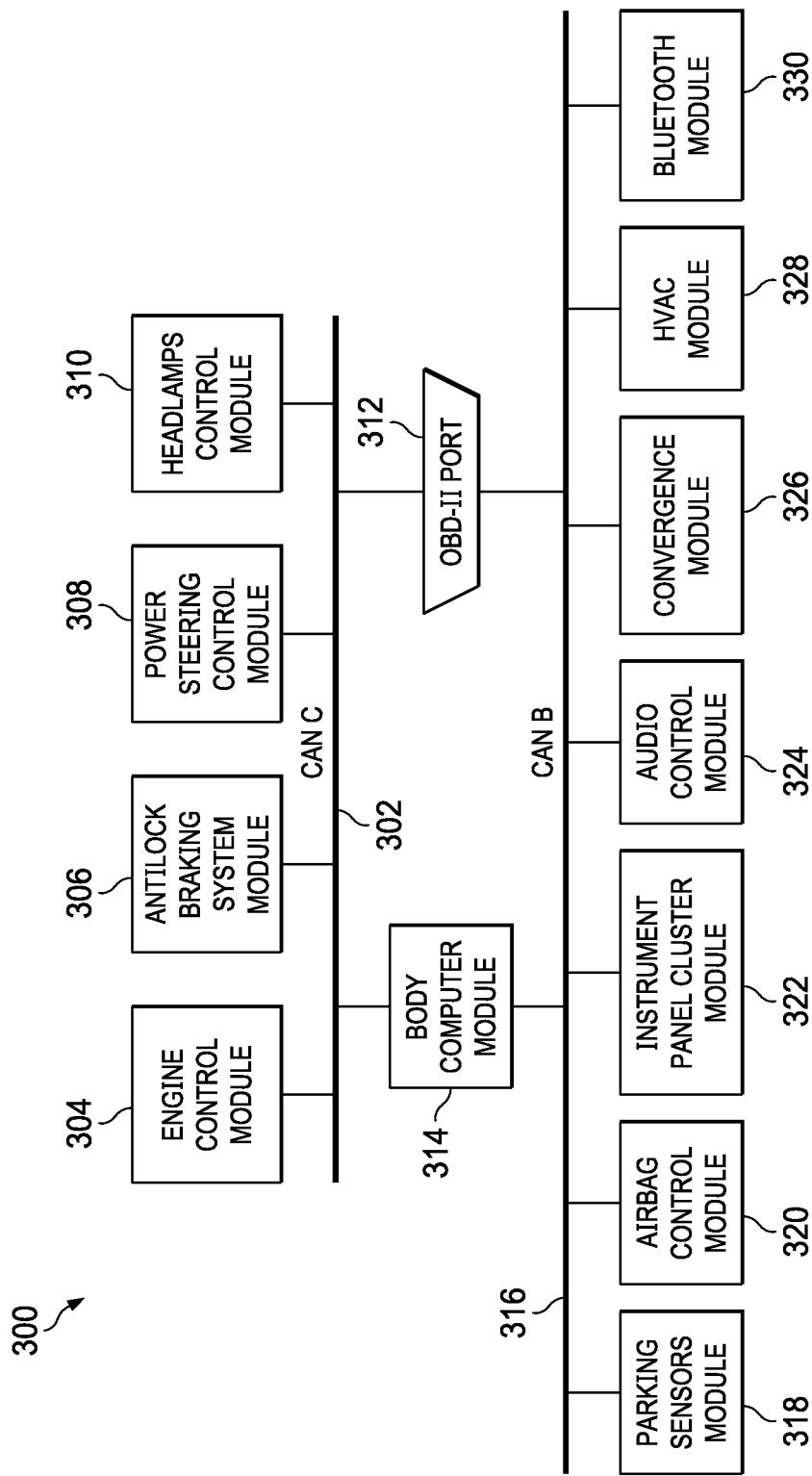
FIG. 3 is a block diagram illustrating the control modules in an automobile.

Referring now to FIG. 3, a block diagram of the control system 300 of an automobile is illustrated. A CAN bus 302 in mode C has connected to it an engine control module 304, an antilock braking system module 306, a power steering control module 308, a headlamps control module 310, an OBD-II port 312 and a body computer module 314. A CAN bus 316 in mode B is connected to the OBD-II port 312 and the body computer module 314 and has connected to it a parking sensors module 318, an airbag control module 320, an instrument contact panel cluster module 322, an audio control module 324, a convergence module 326, an HVAC module 328 and a Bluetooth module 330. These are just exemplary modules and additional modules or fewer modules could be present in a particular car, as could more or less CAN buses or alternative or additional buses.

Figure 4:
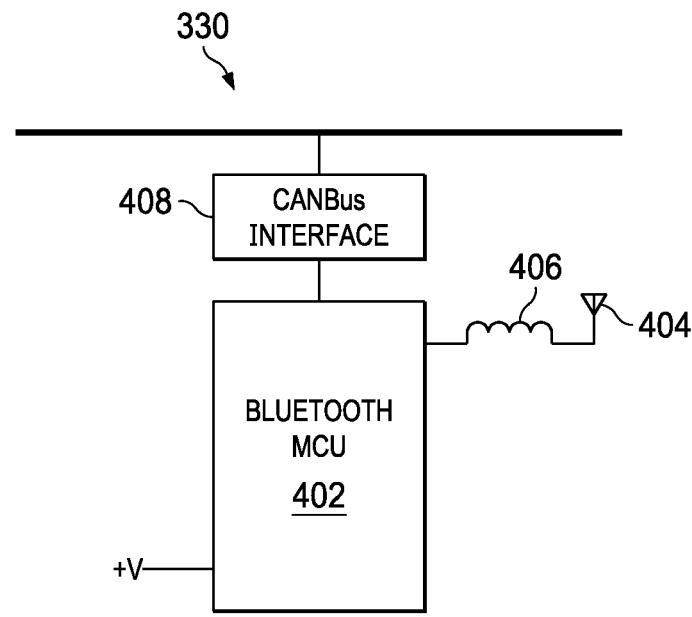
FIG. 4 is a block diagram of the Bluetooth control module of FIG. 3.

FIG. 4 is a simplified block diagram of the Bluetooth module 330 of FIG. 3. A Bluetooth MCU 402, such as the CC2640 described above, forms the primary component of the Bluetooth module 330. An antenna 404 is connected through an inductor 406 to the Bluetooth MCU 402. A CAN bus interface 408 is connected to the CAN bus 316 and to the Bluetooth MCU 402 to allow the Bluetooth module 330 to communicate with the remainder of the automobile. Again, this is a simplified block diagram for the purpose of this explanation and actual modules would include more and different components and be more elaborate.

Figure 5:
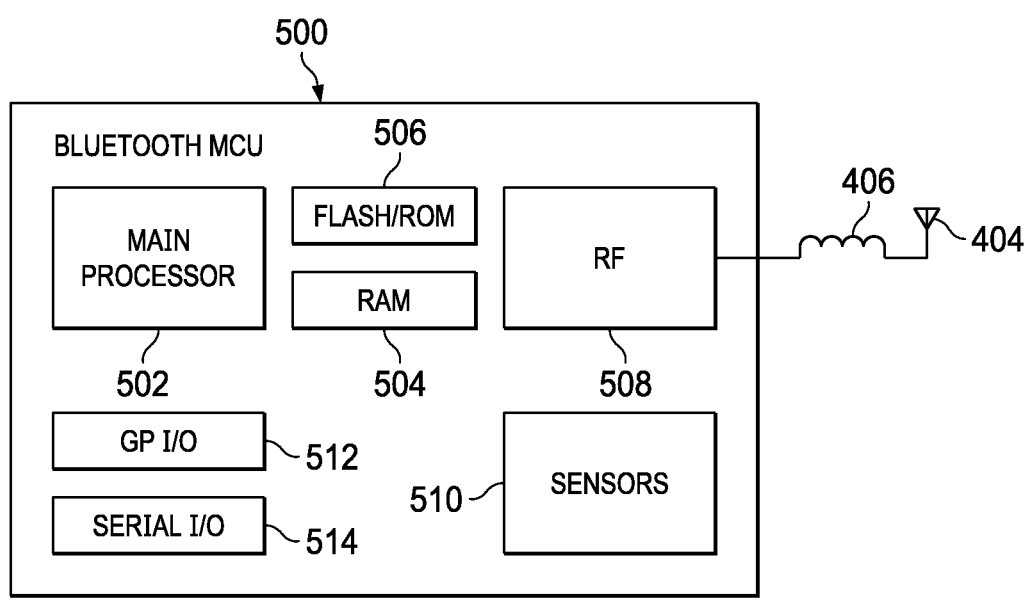
FIG. 5 is a block diagram of a Bluetooth microcontroller.
Figure 5A:
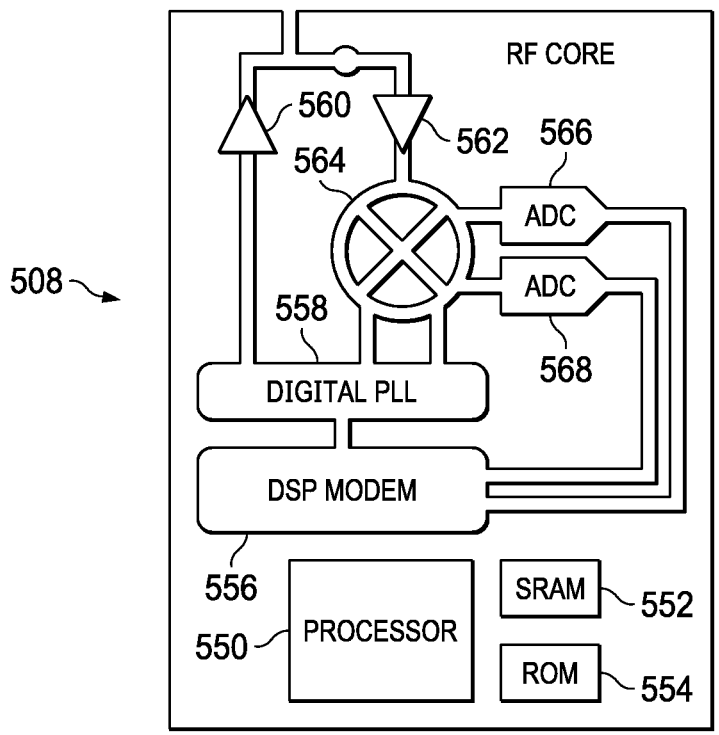
FIG. 5A is a block diagram of the RF section of the microcontroller of FIG. 5.

FIG. 5 is a block diagram of a Bluetooth MCU 500, such as the Bluetooth MCU 402 or the Bluetooth MCU 202. The primary components of a Bluetooth MCU 500, such as the CC2640 SimpleLink™ Bluetooth wireless MCU, include a main processor 502 to perform the primary processing and control functions of the Bluetooth MCU 500. RAM 504 is coupled to the main processor 502 to provide operating memory, while flash memory and/or a read-only memory (ROM) 506 (flash memories and ROMs both being non-transitory computer readable storage media encoded with computer-executable instructions) are connected to the main processor 502 to store the programs used and executed by the main processor 502 to perform the functions of the key fob 200 or the Bluetooth module 330. An RF section 508, which is preferably programmable for multiple frequencies and protocols, is connected to the inductor 406 and the antenna 404 in the illustrated example. As shown in more detail in FIG. 5A, the RF section 508 is a programmable radio system and has sufficient capabilities to allow the main processor 502 to set the desired frequencies and to indicate the desired protocol, such as Bluetooth, Wi-Fi® or the like. The RF section 508 contains a processor 550 for interfacing with the main processor 502 and controlling the RF section 508. SRAM 552 and ROM 554 are connected to the processor 550 to provide the working memory and store the programs. A digital signal processor (DSP) modem 556 is connected to the processor 550, SRAM 552 and ROM 544 and handles the task of converting the digital packets into signals to be transmitted in analog form and converting the received analog signals into digital packets. A digital phase locked loop (PLL) 558 is connected to the DSP modem 556 to generate the frequencies needed for the RF signals being used. An output buffer 560 is connected to the inductor 406 to provide the analog RF output signal. An input buffer 562 is also connected to the inductor 406 to receive the incoming RF signals and provide them to a mixer 564, which mixes the received RF signals with digital PLL 558 outputs. The mixer 564 provides outputs to analog to digital converters (ADC) 566 and 568, whose outputs are provided to the DSP modem 556 for the receive decoding. The DSP modem 556 determines the phase and amplitude of the received Bluetooth signals as discussed below. Programs for the processor 550 and DSP modem 556 are also stored in the flash memory and/or ROM 506 if necessary.

A sensor section 510 is included in the Bluetooth MCU 500 to allow the Bluetooth MCU 500 to perform functions beyond just the Bluetooth communications. A general-purpose I/O section 512 is provided, such as to drive a speaker or LEDs or receive button inputs. A serial I/O section 514 is provided to allow communication with a controlling processor, such as through the CAN bus interface 408.

Figure 6:
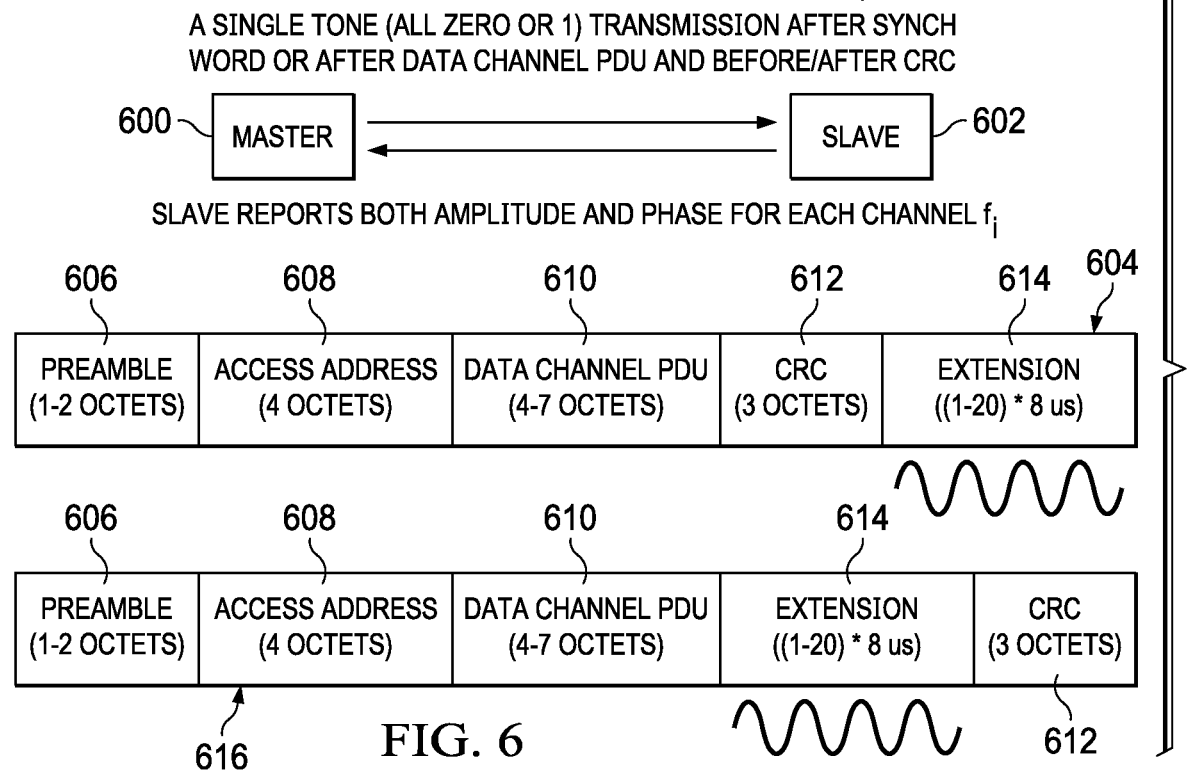
FIG. 6 is a diagram illustrating the communications and example packets exchanged in determining location.

Referring now to FIGS. 6, 7, 7A-7D and 8, operation of a first example is provided. In this first example, a master 600 is determining the location of a slave 602 with respect to the master 600. Referencing the automobile example, the master 600 can be the Bluetooth module 330 and the slave 602 is the Bluetooth key fob 200. The determination of master 600 and slave 602 is performed in a first step B00 as is conventional in Bluetooth operations. The master 600 in step 802 provides a signal to the slave 602 that indicates that distance measurement is commencing. The slave 602 in step 804 enters a receive mode. In step 806 the master 600 sends a measurement packet to the slave 602. Exemplary measurement packet formats are illustrated in FIG. 6. A conventional Bluetooth data packet is modified to include an extension portion 614 to allow a pure sine wave to be transmitted. The first example packet 604 has a preamble 606, followed by an access address 608, a data PDU 610 and a CRC 612 as in conventional Bluetooth. An extension or tone portion 614 is provided after the CRC portion 612 and is an all zero or all one transmission, which thus produces a pure sine wave on the actual RF transmitter. A second example measurement packet 616 includes the preamble 606, access address 608, and data PDU 610, which is followed by the extension portion 614 and concludes with the CRC portion 612. As the master 600 has indicated that distance measurement is occurring, the slave 602 is prepared to receive the packet 604 or 616 and determine the phase and amplitude of the received signals by analyzing the extension portion 614.

In step 810, the slave 602 determines the phase and amplitude of the sine wave portion and provides the phase and amplitude information to the master 600. In step 812, the slave 602 sends a similar measurement packet 604 or 616 to the master 600. In some examples, steps 810 and 812 are merged so that the packet providing the determined phase and amplitude is also the slave to master measurement packet. This measurement packet 604 or 616 from the slave 602 to the master 600 is provided at a different frequency than the measurement packet 604 or 616 provided from the master 600 to the slave 602. This change in frequency occurs naturally in Bluetooth due to the frequency hopping characteristics of Bluetooth but must be performed differently in other protocols. In step 814, the master determines the phase and amplitude of the sine wave portion of the received packet 604 or 616. While this explanation has used only a single measurement transmission from the master 600 to the slave 602 and a single measurement transmission from the slave 602 to the master 600, in other examples this pair of measurement transmissions is performed many times, such as 20 to 40 times, to obtain measurements at more than just the two different frequencies. These multiple measurements allow improved results by averaging results and thus reducing the effects of aberrant measurements. By having the phase and amplitude of both signals, in step 816, the master 600 calculates the distance of the slave 602.

Figure 7:
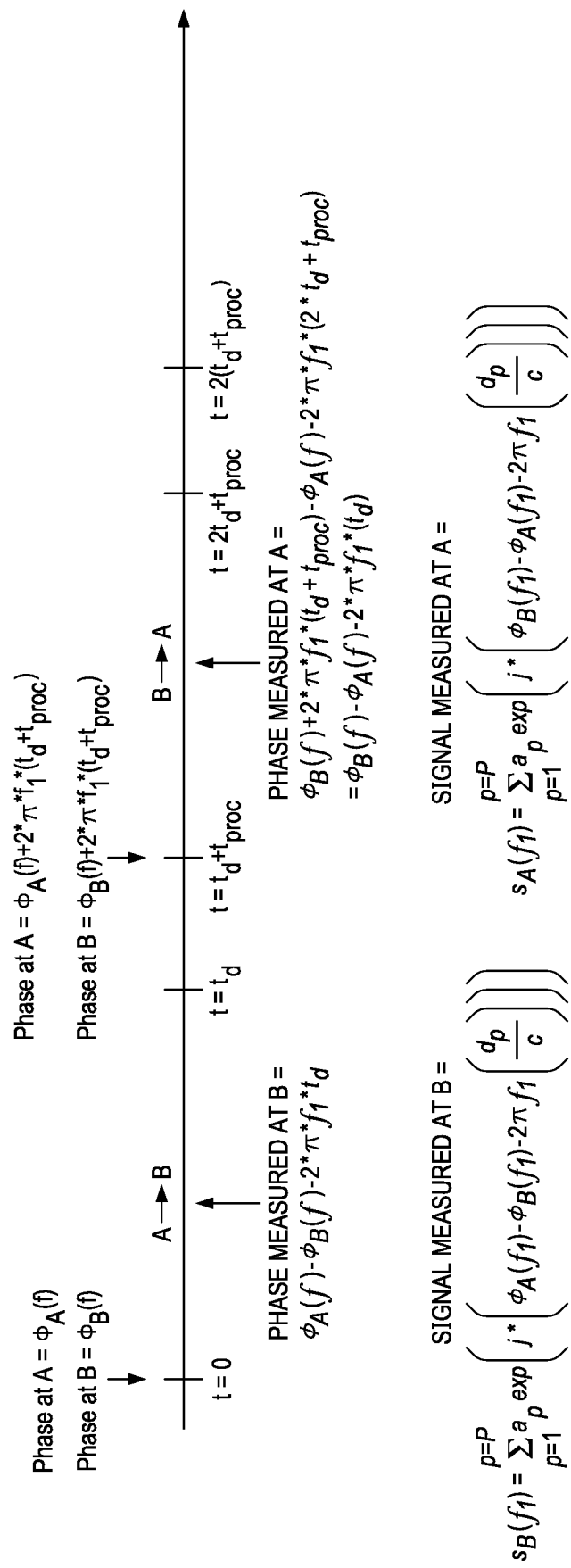
FIG. 7 is a diagram illustrating the timing of the signals and measurements and calculations performed.

FIG. 7 illustrates the timing of these events and particular parameters which are measured. At time t=0, the master, referred to as A in FIG. 7, transmits a measurement packet to the slave, referred to as B in FIG. 7. The phase of the transmitted signal at A for the frequency f at t=0 is $\phi_A(f)$ and that of B at the same time is $\phi_B(f)$. The transmitted signal reaches B at time $t_d$. The slave B processes the received signal, which takes a processing time $t_{proc}$. At the slave B the measured phase of the signal assuming a single path channel is $\phi_A(f_1)-\phi_B(f_1)-2*\pi*f_1*t_d$. The slave B then transmits a measurement packet to the master A. Note that it is important that both the master A and slave B each maintain their respective phase in their respective phase locked loops for that particular frequency $f_1$ while the measurements are taking place. This way the initial phase $\phi_A(f_1)$ and $\phi_B(f_1)$ is maintained while receiving and transmitting the packets at both the Master A and the Slave B. The phase of the transmitted signal at B during transmission now is $\phi_B(f_1)+2*\pi*f_1*(t_d+t_{proc})$. Note the $\phi_B(f_1)$ in this term because of the phase maintenance of the PLL at slave B. The transmitted signal reaches A at time $2t_d+t_{proc}$. The master A processes the received signal, which takes a processing time $t_{proc}$. At the master A the measured phase of the signal assuming a single path channel is $\phi_B(f_1)+2*\pi*f_1*(t_d+t_{proc})-\phi_A(f_1)-2*\pi*f_1*(2*t_d+t_{proc})=\phi_B(f)-\phi_A(f_1)-2*\pi*f_1*(t_d)$. Again notice the phase the $\phi_A(f_1)$ in the above term because of the phase maintenance of the PLL at the master A.

For a multi-path channel the signal measured at the slave B for frequency $f_1$ is:

$$s_B(f_l) = \sum_{p=1}^{p=P} a_p \exp\left(j*\left(\phi_A(f_l) - \phi_B(f_l) - 2\pi f_l\left(\frac{d_p}{c}\right)\right)\right)$$

The signal measured at the master A is:

$$s_A(f_l) = \sum_{p=1}^{p=P} a_p \exp\left(j*\left(\phi_B(f_l) - \phi_A(f_l) - 2\pi f_l\left(\frac{d_p}{c}\right)\right)\right)$$

Where $a_p$ are the attenuation coefficients for the different multi-path reflections with the total number of multi-paths given by P. Since the channel between the master A and the slave B is reciprocal, these attenuation coefficients and the total number of multi-paths are the same in the two directions. The distance $d_p$ is the distance traveled by the multi-path p between the Slave and Master and vice versa. Just as the above equations are for frequency $f_1$, similar equations can be written for other Bluetooth frequencies. Note that Bluetooth uses a 1 MHz bandwidth per channel from the 2400-2480 MHz band, implying there can be up to 80 such measurements for Bluetooth.

Each of these measurements includes both the phase and the amplitude of the received signal. After the master completes its measurement of the signal, the master then computes the multipath content as given below. There are two alternatives, depending on whether the signals are phase coherent at the measured frequencies.

Figure 7A:
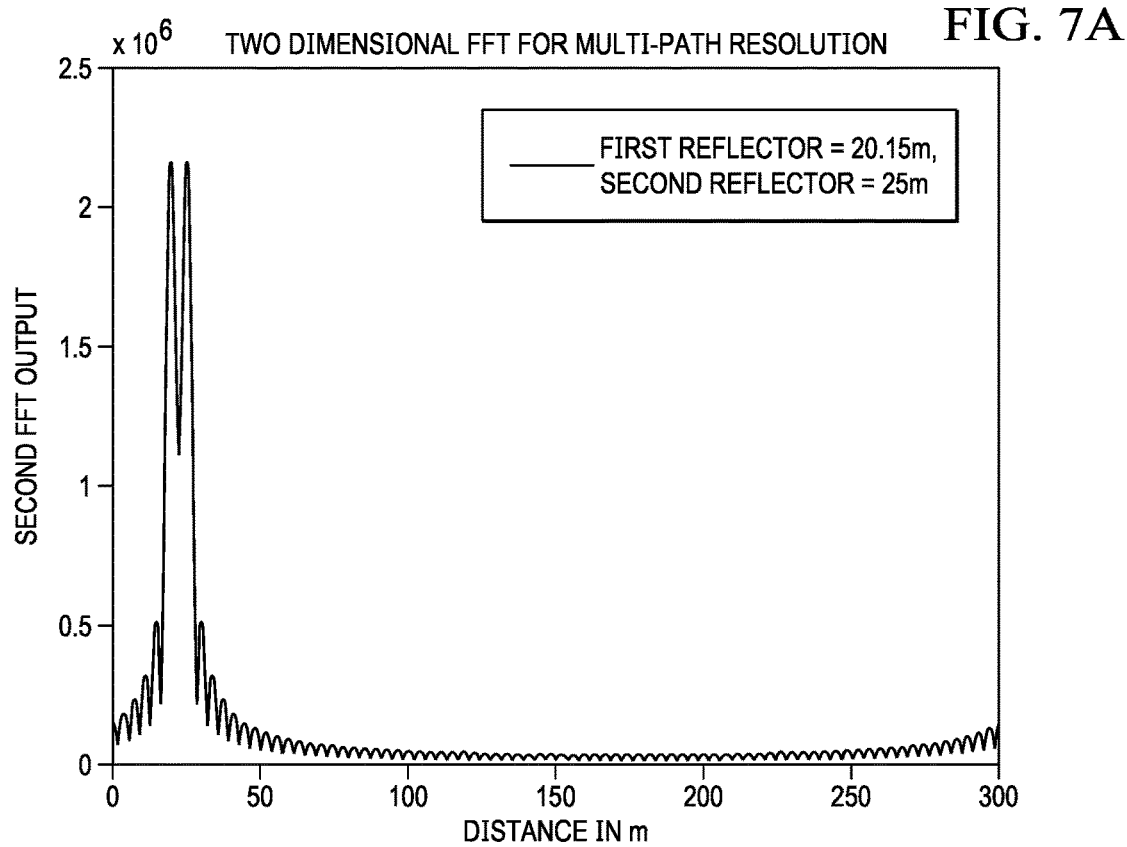
FIGS. 7A-7D are graphs illustrating calculated multipath.
Figure 7B:
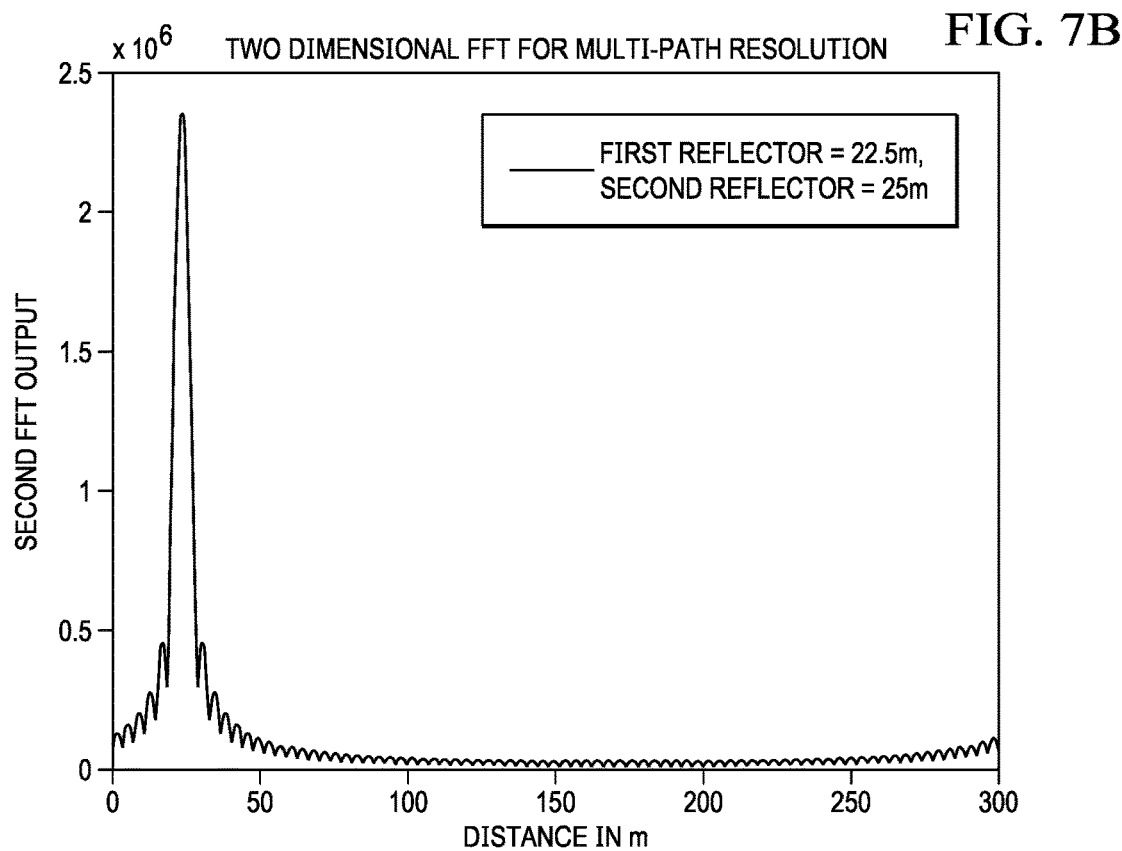

If coherent, the master then performs a Fast Fourier Transform (FFT) on the measured signals to get the channel impulse response in time domain. This result is then used to estimate the distance from the transmitter, the master, by using the occurrence of the first multipath in the FFT with the assumption that the first multi-path is the shortest distance between the master and the slave. FIG. 7A is a graph showing the detected multipath when the reflectors, a target or slave and a reflector to cause multipath, are 20 m and 25 m away from the master. Two distinct peaks are visible, one for each path. FIG. 7B is for a case where the reflectors are 22.5 m and 25 m from the transmitter. In this case there is only a single apparent peak as the reflectors are too close in relation to the bandwidth of Bluetooth, which 80 MHz. Since the bandwidth of the signal is 80 MHz, implying a wavelength of about 3.75 meters, it implies that the accuracy of the FFT would be limited to within this range. Hence the two paths at 22.5 m and 25 m do not give distinct peaks for the FFT algorithm.

For a system employing bandwidth B Hz and with signal to noise ratio (SNR) snr the limits of how accurately time of flight can be determined is given by the Cramer Rao and the Barankin bounds as given in equation 7 in A. Zeira, P. M. Schultheiss, "Realizable Lower Bounds for Time Delay Estimation: Part 2-Threshold Phenomena," IEEE Transactions on Signal Processing, Volume: 42, Issue: 5, May 1994, pp 1001-1007, which is hereby incorporated by reference [Zeira-paper], provided here.

$$BB(\hat{\tau}) \cong \frac{\delta^2}{\exp\{SNR \cdot \beta^2 \cdot \delta^2\} - 1} + \frac{\varepsilon^2}{\exp\{SNR \cdot \omega_o^2 \cdot \varepsilon^2\} - 1}$$

Where $\beta=2*\pi*BW$ $\delta=2\pi/\omega_0$ and $$\varepsilon << \frac{\beta}{\omega_0}.$$

For Bluetooth case, BW is about 80 MHz and the center frequency $\omega_0$=2440 MHz. For high SNR conditions, the first term tends to zero since the bandwidth is much smaller than the center frequency and the bound converges to $$BB(\tau^2) \cong \frac{1}{\omega_o^2 \cdot SNR}$$

which we call as the carrier frequency limited accuracy. On the other hand for small SNR's the first term dominates the bound by $$BB(\tau^3) \cong \frac{1}{SNR}\left(\frac{1}{\beta^2} + \frac{1}{\omega_o^2}\right) \cong \frac{1}{\beta^2 \cdot SNR}$$

which we call the limit of the inverse of the bandwidth of the signal.

What the above bounds say is that with high enough SNR conditions the performance of locationing algorithm is limited by the inverse of carrier frequency, which in case of Bluetooth would be about 12.5 cm. Thus, with high enough SNR it is possible to beat the apparent limit of FFT (which is the inverse of the bandwidth of the signal—in case of Bluetooth about 3.75 m) to get to the carrier wavelength which 12.5 cm. Super-resolution algorithms try to achieve this carrier frequency limited higher accuracy to resolve the multi-path as compared to the bandwidth limited accuracy.

An example super resolution algorithm is MUSIC (MUltiple SIgnal Classification). By knowing the multipath, applying the MUSIC algorithm allows a resolution of 10 to 20 cm to be obtained. Super resolution algorithms work on the net channel estimate between the Master and Slave across different frequencies. Before we describe this algorithm, we explain how the channel estimate is obtained.

Further processing is needed before the FFT and subsequent super resolution algorithm can be applied to obtain the master to slave channel response across frequency. As a first step, $s_A(f_1)$ and $s_B(f_1)$ are multiplied. This produces the net channel estimate equation:

$$s_B(f_l) * s_A(f_l) = \left( \sum_{p=1}^{p=P} a_p \exp\left( j * \left( -2\pi f_l \left( \frac{d_p}{c} \right) \right) \right) \right)^2$$

This is an equation in the form $(H(w))^2$, which is $h(t)*h(t)$, and then $h(t)$ needs to be found. A direct square root cannot be taken because of the possibility of a phase ambiguity of +/−pi across the frequency range.

In a first option, the phase change across consecutive frequencies is checked to determine if the phase change is less than a certain threshold, such as pi/2. If the phase change is greater than the threshold, an additional pi phase is added or subtracted. When this has been completed for all frequencies being analyzed, then the FFT is applied and results as shown above for the coherent instance are produced.

Figure 7C:
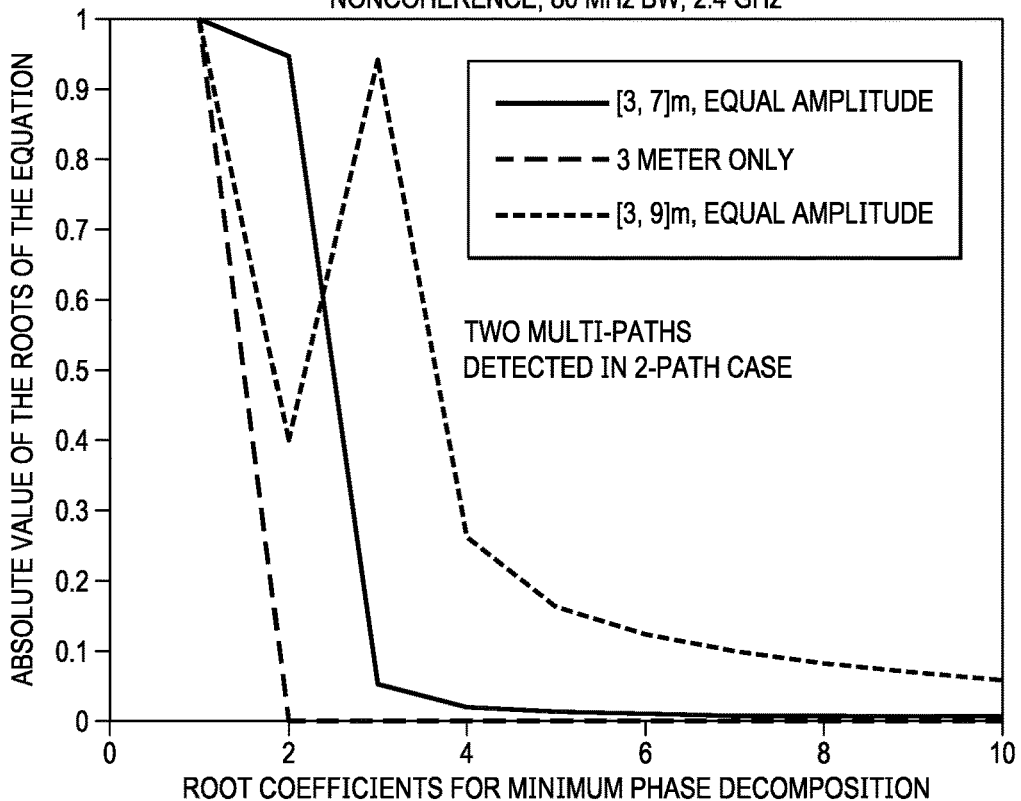
Figure 7D:
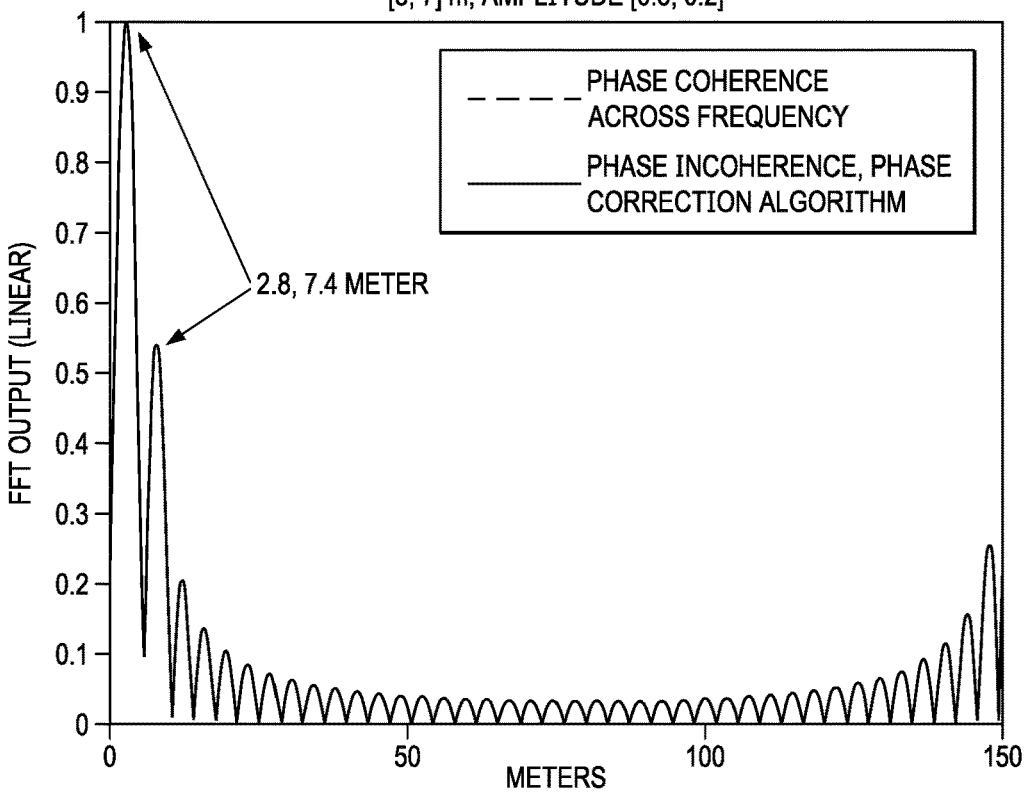
Figure 8:
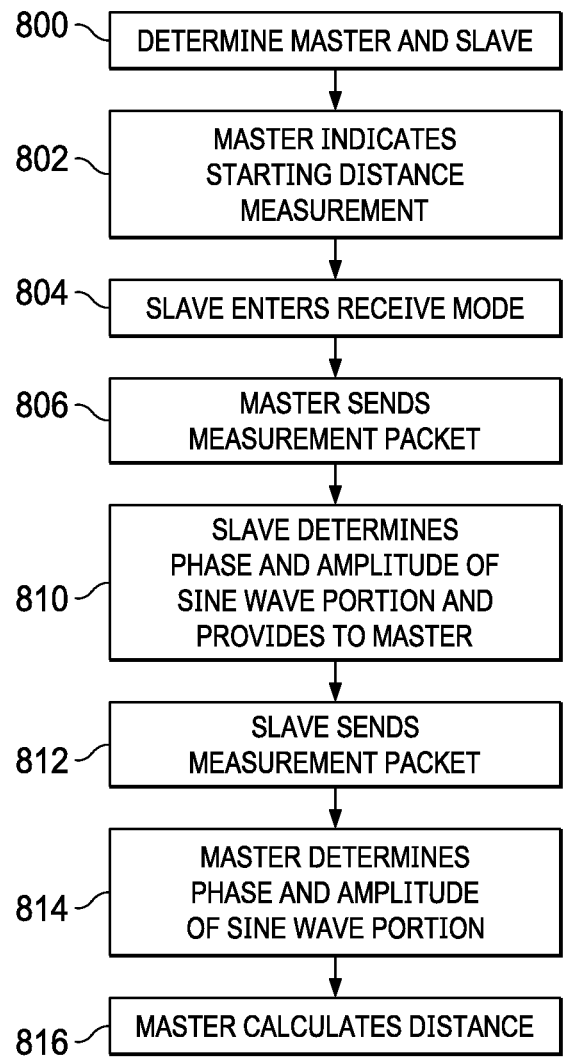
FIG. 8 is a flowchart of operations to determine location.

In a second option, it is noted that $|(H(w))^2|=|H(w)|^2$. Solving for the minimum phase roots of $|H(w)|^2$ is equivalent to determining $h(t)*h(-t)$. This is because for minimum phase systems the frequency response can be uniquely recovered from the magnitude alone as discussed in "Discrete-Time Signal Processing, OpenCourseWare 2006, Lecture 3, Minimum-Phase and All-Pass Systems," Massachusetts Institute of Technology Department of Electrical Engineering and Computer Science, ocw.mitedu/courses/electrical-engineering-and-computer-science/6-341-discrete-time-signal-processing-fall-2005/lecture-notes/leco3.pdf, especially p. 2 on spectral factorization, which is hereby incorporated by reference. The resulting h(t) is the solution and the FFT is performed on the phase corrected net channel estimate as given in the above equation. The root determination is illustrated in FIG. 7C for a case having two reflectors, one at 7 m and one at 9 m, with the actual object or target being at 3 m. The result of the FFT on the 7 m case is shown in FIG. 7D, with peaks at 2.8 m and 7.4 m representing the target object and the reflector. The error of 20 cm for the object is within the desired accuracy.

Following the FFT, the principal multi-path components (the first 1-2 multi-path components) can be sorted while the rest of the FFT in time domain can be set to zero. An inverse FFT (IFFT) can now be performed to go back to frequency domain. This time the channel is windowed in the time domain to keep the principal multi-path components. A super resolution algorithm can now be applied on this frequency domain channel (or the super resolution algorithm can also be applied on the whole channel as given in the channel estimate equation above). The basic MUSIC algorithm that can be used for super-resolution is given in GIRD Systems, Inc., "An Introduction to MUSIC and ESPRIT," www.girdsystems.com/pdf/GIRD_Systems_Intro_to_MUSIC_ESPRIT.pdf, esp. slides 9-12, which is hereby incorporated by reference. MUSIC algorithms are typically applied for multiple antenna systems to resolve multiple targets impinging on the array manifold. However in the problem at hand, we can treat the different frequency measurements in Bluetooth like a multiple antenna system. One of the problems in the application of the MUSIC algorithm as given in "An Introduction to MUSIC and ESPRIT" is the correlation between the sources which will occur in the case of a multi-path channel (since the source is the same for the different multi-paths). To solve this problem of correlated sources a modification to the basic MUSIC algorithm is proposed as given in Chongying Qi, Yongliang Wang, Yongshun Zhang, and Ying Han, "Spatial Difference Smoothing for DOA Estimation of Coherent Signals," IEEE Signal Processing Letters, Volume: 12, Issue: 11, November 2005, pp. 800-802, which is hereby incorporated by reference. Again, the received signal X(t) in "Spatial Difference Smoothing for DOA Estimation of Coherent Signals" is equivalent to the net channel estimate equation given above.

A series of experiments were conducted using the above approaches for varying reflector distances. In the experiments, the main path or target was at 0.5 m and the reflector location was varied from 1 m to 4.5 m in 0.5 m steps. Table 1 presents the estimates and errors for phase interferometry only, the addition of amplitude measurements and FFT processing, and for the final MUSIC processing.

TABLE 1

| Signal paths (m) | [0.5, 1] | [0.5, 1.5] | [0.5, 2] | [0.5, 2.5] | [0.5, 3] | [0.5, 3.51] | [0.5, 4.0] | [0.5, 4.5] |
|---|---|---|---|---|---|---|---|---|
| Estimate (m) phase interferometry | 0.64 | 1.1 | 1.2 | 1.4 | 1.2 | 1.1 | 1.6 | 1.2 |
| Error (m) Phase only | 0.14 | 0.6 | 0.7 | 0.9 | 0.7 | 0.6 | 1.1 | 0.7 |
| Estimate (m) (FFT) | 0.7 | 1.0 | 1.1 | 1.3 | [1.1] | [−0.2, 4.4] | [0.22, 4.4] | [0.1, 5.1] |
| Error (m) (FFT) | 0.2 | 0.5 | 0.6 | 0.8 | 0.6 | −0.7 | −0.28 | −0.4 |
| Estimate (m) (MUSIC) | 0.69 | 0.9 | [0.74, 1.9] | [0.65, 2.2] | [0.65, 3] | [0.49, 3.51] | [0.49, 3.98] | [0.43, 4.7] |
| Error (m) (MUSIC) | 0.19 | 0.4 | 0.24 | 0.15 | 0.15 | −0.01 | −0.01 | −0.07 |

As can be seen, after MUSIC processing, the error is generally in the range of 10 cm-20 cm. This allows much more accurate determination of the object as compared to other techniques. In the automobile example, this allows a determination of when the key fob is inside the automobile, as needed for not locking and for starting, or outside of the automobile, as needed for locking and unlocking.

While the above description has used Bluetooth as the exemplary RF protocol, other protocols can be used as well, such as Wi-Fi. Further, frequencies other than the 2.4 GHz of Bluetooth can be used, such as the 900 MHz spectrum.

While an automobile and a key fob were used as the example need for precise distance measurements, many other environments are appropriate. For example, in a warehouse, the target objects are the boxes and packages. In a construction environment, the power tools are the target objects. In a retail environment, the various items are the target objects. In a farm environment, the livestock are the target objects. The particular protocol used depends on the desired distance, but in all instances the protocols allow the transfer of specific information about the object to aid in identifying the object. In the automobile example, the security code of the key fob is exchanged with the automobile to identify the key fob association with the specific automobile.

The above-described examples may be used in combination with each other. Modifications are possible in the described embodiments, and other embodiments are possible, within the scope of the claims.

The invention claimed is:

1. A method for determining a distance between first and second devices, the method comprising:
   transmitting a first packet by the first device toward the second device;
   receiving, by the first device from the second device, a first phase and a first amplitude determined for the first packet by the second device;
   receiving, by the first device from the second device, a second packet;
   determining, by the first device, a second phase and a second amplitude for the second packet; and
   determining, by the first device, the distance between the first and second devices based on the first phase and the first amplitude determined for the first packet by the second device and the second phase and the second amplitude determined for the second packet by the first device;
   wherein a packet comprises an access address.

2. The method of claim 1, wherein determining the distance includes:
   determining a net channel estimate based on the first phase and the first amplitude determined for the first packet by the second device and the second phase and the second amplitude determined for the second packet by the first device;
   performing a fast Fourier transform (FFT) on the net channel estimate to obtain a channel impulse response;
   determining a multipath component at a peak in the channel impulse response; and
   determining the distance based on the multipath component.

3. The method of claim 2, wherein the FFT is performed directly on the net channel estimate when the first and second phases are coherent.

4. The method of claim 2, wherein determining the distance further includes performing phase change correction of the first and second phases prior to performing the FFT when the first and second phases are incoherent.

5. The method of claim 2, wherein determining the distance further includes determining minimum phase roots of the first and second phases prior to performing the FFT when the first and second phases are incoherent.

6. The method of claim 2, wherein determining the distance further includes:
   performing an inverse fast Fourier transform (IFFT) on the multipath component to obtain an IFFT result; and
   applying a super resolution algorithm on the IFFT result.

7. The method of claim 1, wherein the first packet includes a first portion having all ones or all zeros for use in generating a first sine wave for determining the first phase and the first amplitude for the first packet, and the second packet includes a second portion having all ones or all zeros for use in generating a second sine wave for determining the second phase and the second amplitude for the second packet.

8. The method of claim 1, wherein the first phase and the first amplitude determined for the first packet is included in the second packet.

9. The method of claim 1, wherein:
   the first packet is transmitted at a first frequency;
   the second packet is transmitted at a second frequency that is different from the first frequency; and
   an initial phase relationship between respective phase-locked loops in the first and second devices is maintained as the first and second packets are transmitted, as the first phase and first amplitude are determined, and as the second phase and second amplitude are determined.

10. A device comprising:
    radio frequency circuitry configured to transmit a first packet toward a second device and receive a second packet from the second device; and
    a processor coupled to the radio frequency circuitry and configured to:
       detect a first phase and a first amplitude determined for the first packet by the second device;
       determine a second phase and a second amplitude for the second packet;
       determine a multipath component based on the first phase and the first amplitude determined for the first packet by the second device and the second phase and the second amplitude determined for the second packet; and
       determine a distance to the second device based on the multipath component;
    wherein a packet comprises an access address.

11. The device of claim 10, wherein the processor configured to determine the multipath component includes the processor configured to:
    determine a net channel estimate based on the first phase and the first amplitude determined for the first packet by the second device and the second phase and the second amplitude determined for the second packet;
    perform a fast Fourier transform (FFT) on the net channel estimate to obtain a channel impulse response; and
    determine the multipath component at a peak in the channel impulse response.

12. The device of claim 11, wherein the FFT is performed directly on the net channel estimate when the first and second phases are coherent.

13. The device of claim 11, wherein the processor configured to determine the multipath component includes the processor configured to perform phase change correction of the first and second phases prior to performing the FFT when the first and second phases are incoherent.

14. The device of claim 11, wherein the processor configured to determine the multipath component includes the processor configured to determine minimum phase roots of the first and second phases prior to performing the FFT when the first and second phases are incoherent.

15. The device of claim 11, wherein the processor configured to determine the distance includes the processor configured to:
    perform an inverse fast Fourier transform (IFFT) on the multipath component to obtain an IFFT result; and
    apply a super resolution algorithm on the IFFT result.

16. The device of claim 10, wherein the first packet includes a first portion having all ones or all zeros for use in generating a first sine wave for determining the first phase and the first amplitude for the first packet, and the second packet includes a second portion having all ones or all zeros for use in generating a second sine wave for determining the second phase and the second amplitude for the second packet.

17. The device of claim 10, wherein the first phase and the first amplitude determined for the first packet is included in the second packet.

18. The device of claim 10, wherein:
the first packet is transmitted at a first frequency;
the second packet is transmitted at a second frequency that is different from the first frequency;
the radio frequency circuitry includes a first phase-locked loop (PLL); and
the processor is further configured to:
maintain an initial phase for the first PLL relative to an initial phase of a second PLL in the second device as the first packet is transmitted, as the second packet is received, and as the second phase and the second amplitude are determined for the second packet.

19. A device comprising:
radio frequency circuitry configured to receive a first packet from a distance determining device at a first frequency and transmit a second packet toward the distance determining device at a second frequency that is different than the first frequency, the radio frequency circuitry including a first phase-locked loop (PLL); and
a processor coupled to the radio frequency circuitry and configured to:
determine a phase and an amplitude for the first packet;
send the determined phase and amplitude for the first packet toward the distance determining device; and
maintain an initial phase of the first PLL relative to an initial phase of a second PLL in the distance determining device when the phase and amplitude for the first packet is determined and as the second packet is transmitted toward the distance determining device;
wherein a packet comprises an access address.

20. The device of claim 19, wherein the first packet includes a first portion having all ones or all zeros for use in generating a first sine wave for determining the phase and the amplitude for the first packet, and the second packet includes a second portion having all ones or all zeros for use in generating a second sine wave for determining a phase and an amplitude for the second packet.

21. The device of claim 19, wherein the processor is further configured to: enter a receiving mode upon receiving an indication that a distance measurement is starting.

22. The device of claim 19, wherein the first and second packets are sent in Bluetooth® signals.

23. The method of claim 1 wherein a packet further comprises a data protocol data unit (PDU).

24. The method of claim 23 wherein a packet further comprises a cyclic redundancy check (CRC) portion.

25. The method of claim 24 wherein a packet further comprises comprising a tone portion.

26. A method for determining a distance between first and second devices, the method comprising:
transmitting a first packet by the first device toward the second device;
receiving, by the first device from the second device, a first phase and a first amplitude determined for the first packet by the second device;
receiving, by the first device from the second device, a second packet;
determining, by the first device, a second phase and a second amplitude for the second packet; and
determining, by the first device, the distance between the first and second devices based on the first phase and the first amplitude determined for the first packet by the second device and the second phase and the second amplitude determined for the second packet by the first device;
wherein a packet comprises a preamble.

27. The method of claim 26 wherein a packet further comprises an access address.

28. The method of claim 27 wherein a packet further comprises a data protocol data unit (PDU).

29. The method of claim 28 wherein a packet further comprises an extension portion.

30. The method of claim 29 wherein a packet further comprises a cyclic redundancy check (CRC) portion.

31. The device of claim 10 wherein a packet further comprises a data protocol data unit (PDU).

32. The device of claim 31 wherein a packet further comprises a cyclic redundancy check (CRC) portion.

33. The device of claim 32 wherein a packet further comprises a tone portion.

34. A device comprising:
radio frequency circuitry configured to transmit a first packet toward a second device and receive a second packet from the second device; and
a processor coupled to the radio frequency circuitry and configured to:
detect a first phase and a first amplitude determined for the first packet by the second device;
determine a second phase and a second amplitude for the second packet;
determine a multipath component based on the first phase and the first amplitude determined for the first packet by the second device and the second phase and the second amplitude determined for the second packet; and
determine a distance to the second device based on the multipath component;
wherein a packet comprises a preamble.

35. The device of claim 34 wherein a packet further comprises an access address.

36. The device of claim 35 wherein a packet further comprises a data protocol data unit (PDU).

37. The device of claim 36 wherein a packet further comprises an extension portion.

38. The device of claim 37 wherein a packet further comprises a cyclic redundancy check (CRC) portion.

* * * * *